US006228155B1

United States Patent
Tai

(10) Patent No.: US 6,228,155 B1
(45) Date of Patent: May 8, 2001

(54) AUTOMATIC DETECTION AND WARNING DEVICE OF FILTERING NET IN AIR CONDITIONER

(76) Inventor: Kuo Cheng Tai, No. 183, Lane 226, San Lin Duan, Chung Cheng Rd., Lung-Tan Country, Tao-Yuan Hsien (TW)

( * ) Notice: Subject to any disclaimer, the term of this patent is extended or adjusted under 35 U.S.C. 154(b) by 0 days.

(21) Appl. No.: 09/379,743

(22) Filed: Aug. 24, 1999

(51) Int. Cl.$^7$ .................................................. B01D 35/143
(52) U.S. Cl. .......................... 96/413; 96/417; 96/418; 96/419; 55/DIG. 34
(58) Field of Search ........................... 96/413, 417, 418, 96/419, 421, FOR 170; 55/DIG. 34; 116/DIG. 25; 73/863.23

(56) References Cited

U.S. PATENT DOCUMENTS 2,579,477 * 12/1951 Dauphinee ............................. 96/421
5,917,141 * 6/1999 Naquin, Jr. ............................. 96/417

FOREIGN PATENT DOCUMENTS 3-267108 * 11/1991 (JP) ................................. 73/863.23
4-163782 * 6/1992 (JP) .
4-200707 * 7/1992 (JP) ................................. 73/863.23
5-31314 * 2/1993 (JP) ................................. 96/FOR 170

* cited by examiner

Primary Examiner—Duane Smith
Assistant Examiner—Robert A. Hopkins
(74) Attorney, Agent, or Firm—Rosenberg, Klein & Lee

(57) ABSTRACT

An automatic detection and warning device of the filtering net of an air conditioner comprises: an outer frame installed with at least one wind inlet and at least one wind outlet, a wind groove being formed between the wind inlet and the wind outlet; a sampling filtering net installed in the wind groove of the outer frame; a detecting unit comprising a transmitter and a receiver for detecting the amount of collecting dusts on the sampling filtering net; and a circuit unit installed within the outer frame for controlling the operation of the detecting unit. Thereby, the amount of collecting dusts on the filtering net of an air conditioner can be determined so as to warn the user.

16 Claims, 6 Drawing Sheets

AUTOMATIC DETECTION AND WARNING DEVICE OF FILTERING NET IN AIR CONDITIONER

FIELD OF THE INVENTION

The present invention relates to a automatic detection and warning device of the filtering net of an air conditioner, and especially to an automatic detection and warning device which can be appended to the wind channel of an air conditioner independently, or is incorporated to a filtering net of an air conditioner to be as one part of the filtering net.

BACKGROUND OF THE INVENTION

In the prior art, the filtering net primarily filters dusts, particles or hairs in the air as an air filtering device of an air conditioner. The filtering net is an important element. The current used filtering net can be classified as a high density filtering net and a lower density filtering net. These two filtering nets are reused through updating and cleaning. Namely, a timer is installed within the air conditioner. After a predetermined time (for example 500 hour or 1000 hours) has elapsed, the air conditioner is stopped or a warning lamp is bright up for informing the user to update or cleaning the filtering net.

However, The prior art filtering nets of air conditioners are very rough, it can not decide whether the amount of collecting dusts has over a threshold value. Therefore, often, in a dirty environment, the filtering net is too dirty but still in use so that the lifetime of the air conditioner is reduced greatly. Inversely, in a cleaning environment, it is often a clean filtering net is updated due to preset time having been elapsed. These not only trouble the user, but also the cost of updating filtering net is increased.

SUMMARY OF THE INVENTION

Accordingly, the primary object of the present invention is to provide an automatic detection and warning device of the filtering net of an air conditioner comprising a outer frame, a sampling filtering net, a detecting unit and a circuit unit. The present invention can be directly added to the filtering net of an air conditioner. In the present invention, by a design of the sampling filtering net, the amount of collecting dusts on the sampling filtering net is as an object of sensing. Thus, the amount of collecting dusts on the sampling filtering net can be detected so as to emit a warning to inform the user. Moreover, under the condition of unchanging the conventional filtering net of an air conditioner, the present invention can be added to an air conditioner. While the conventional way of accumulating the use time of the air conditioner is improved by the present invention.

Another object of the present invention is to provide an automatic detection and warning device of the filtering net of an air conditioner, wherein by adjusting an adjusting rod to various orientations, meanwhile, the incident angle of the transmitter of a detecting unit is also changed so as to set the amount of collecting dust.

The various objects and advantages of the present invention will be more readily understood from the following detailed description when read conjunction with the appended drawing.

DETAILED DESCRIPTION OF THE PREFERRED EMBODIMENTS

Figure 1:
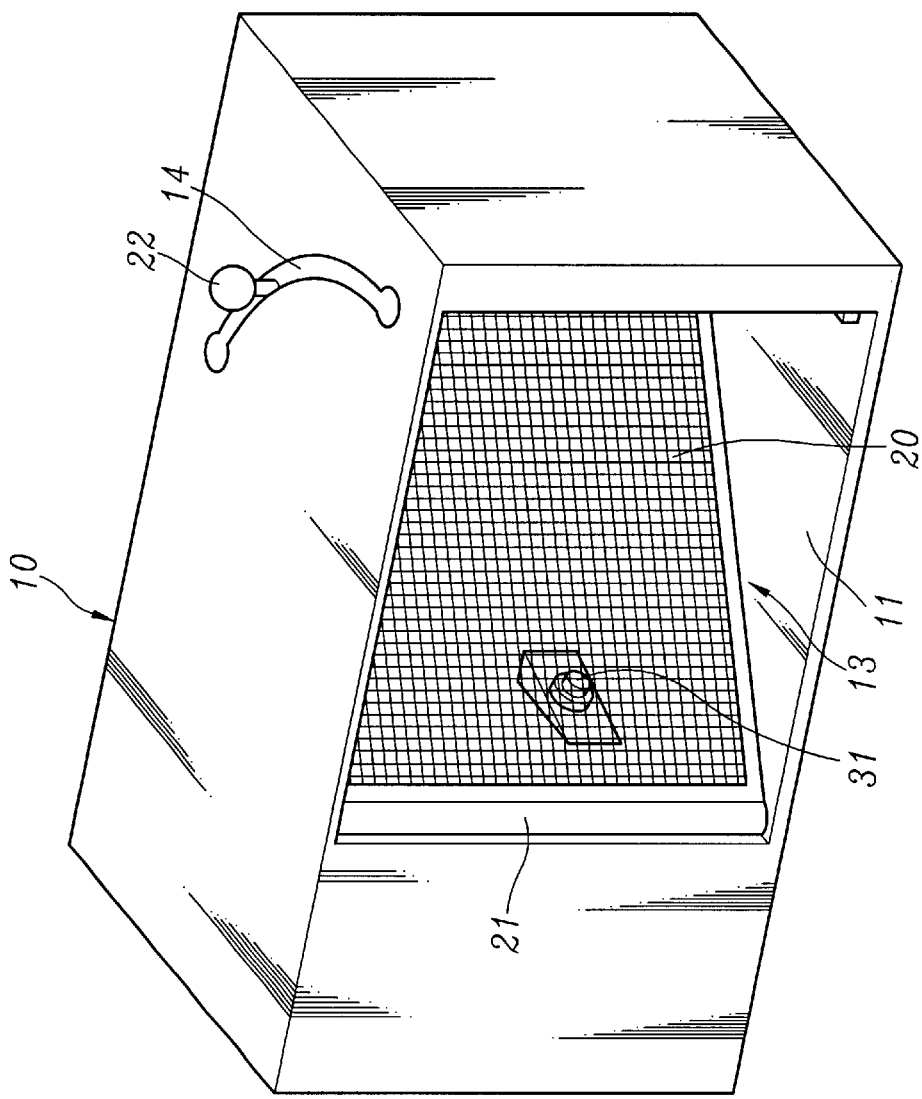
FIG. 1 is a perspective view of the present invention.
Figure 2:
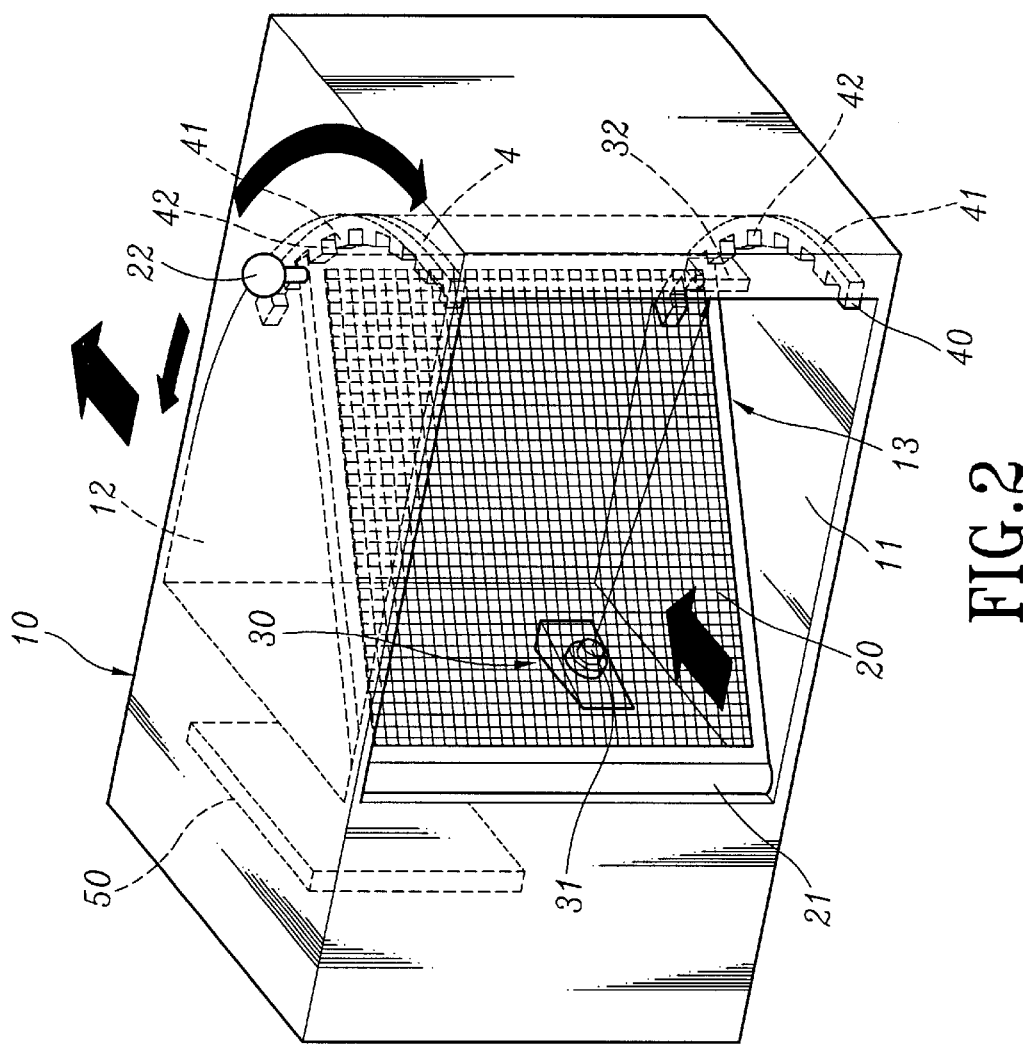
FIG. 2 is a perspective view showing the inner structure of the present invention.
Figure 4:
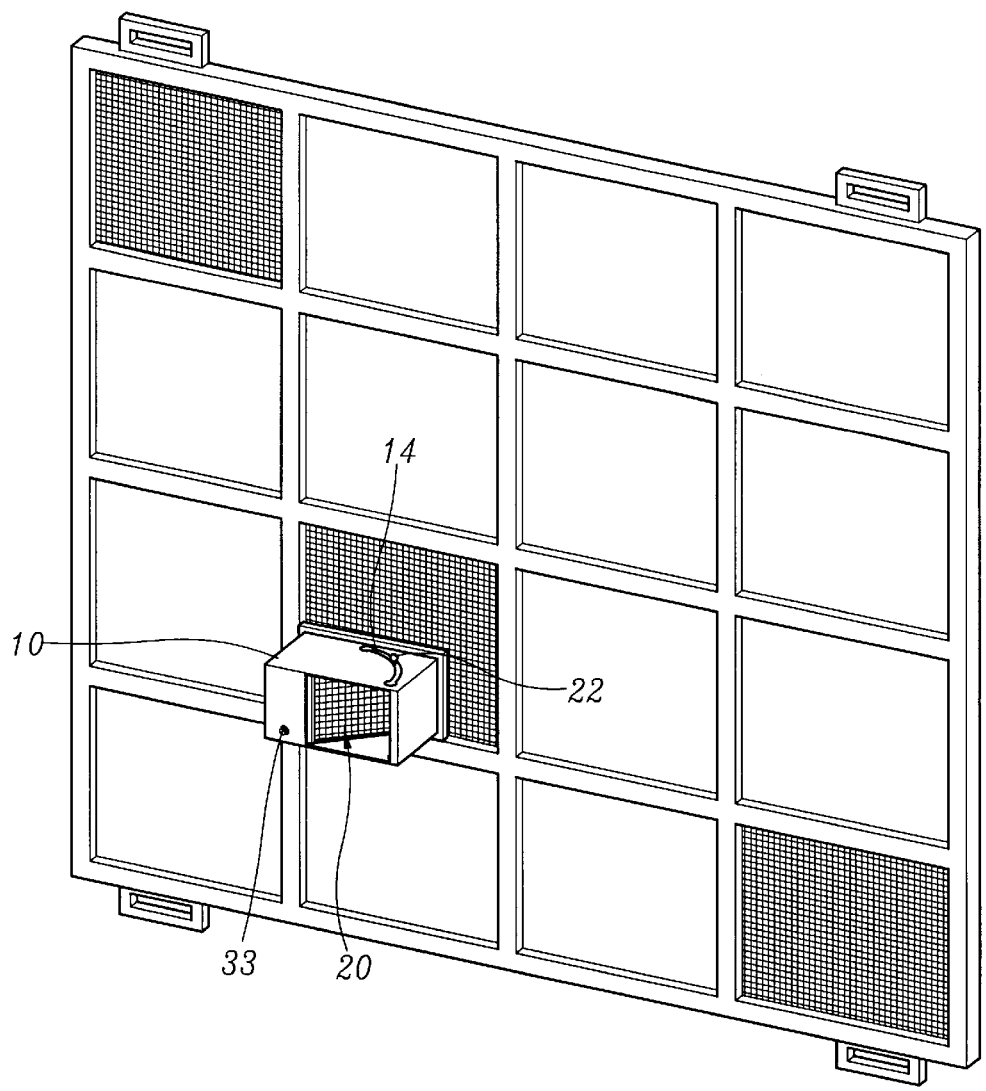
FIG. 4 is a schematic view showing an embodiment that the filtering net of the present invention is arranged to an air conditioner.

Referring to FIGS. 1 and 2, the automatic detection and warning device of the filtering net of an air conditioner according to the present invention is illustrated therein. Especially, the filtering net of an air conditioner of the present invention can be installed within the wind channel of the air conditioner to be formed with an independent detection and sensing device of a filtering net. It can also be combined to the filtering net of an air conditioner (as shown in FIG. 4) to become the detection and warning device of the filtering net. The automatic detection and warning device of the filtering net of an air conditioner according to the present invention includes an outer frame 10, a sampling filter net 20, a detecting unit 30, a track groove adjusting unit 40, and a circuit unit 50. The outer frame 10 is a hollow body without any confinement at the shape thereof. At least one wind inlet 11 and one wind outlet 12 are installed on the outer frame 10. A wind groove 13 is formed between the wind inlet 11 and the wind outlet 12 so that the sampling filtering net 20 and the track groove adjusting unit 40 can be installed within the wind groove 13. The lateral wall of the outer frame 10 is further installed with a circular adjusting groove 14.

The sampling filtering net 20 is a small filtering net for sampling. One side thereof is installed with a pivotal shaft 21 for being pivotally connected to the wind groove 13 of the outer frame 10 and is detachable. Another side of the sampling filtering net 20 is installed with an adjusting rod 22 at the top thereof. The adjusting rod 22 projects to the outside of the outer frame 14 through the adjusting groove 14. The adjusting rod 22 may move along the adjusting groove 14 of the outer frame 10 for driving the sampling filtering net 20 to be positioned in different angle for receiving wind. In other words, the change of the angle of the sampling filtering net 20 also changes the incident angle of the transmitter 31 of the detecting unit 30. By the difference of the incident angle of the transmitting 31, different amount of collecting dusts is achieved.

Figure 3:
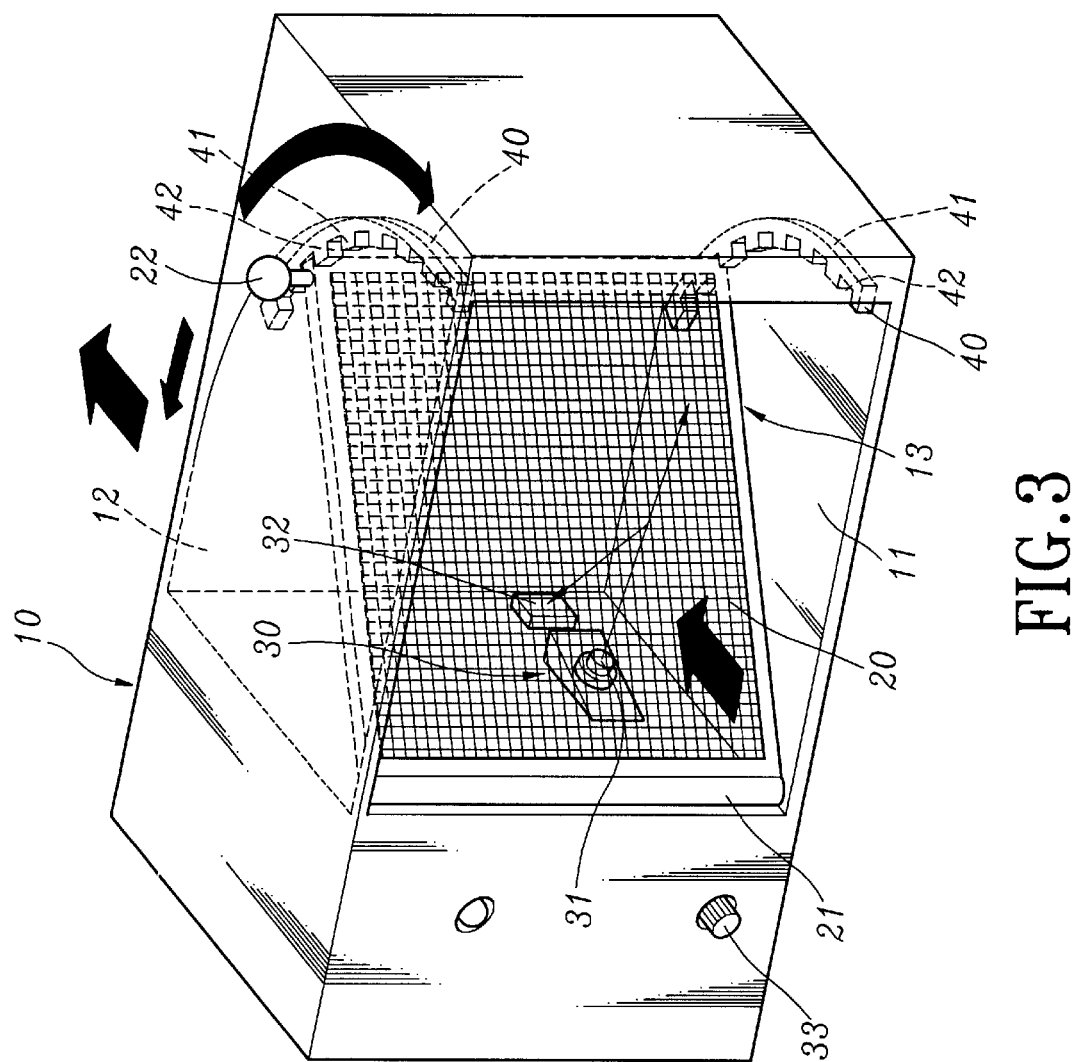
FIG. 3 is a perspective view showing the inner structure of another embodiment of the present invention.
Figure 5:
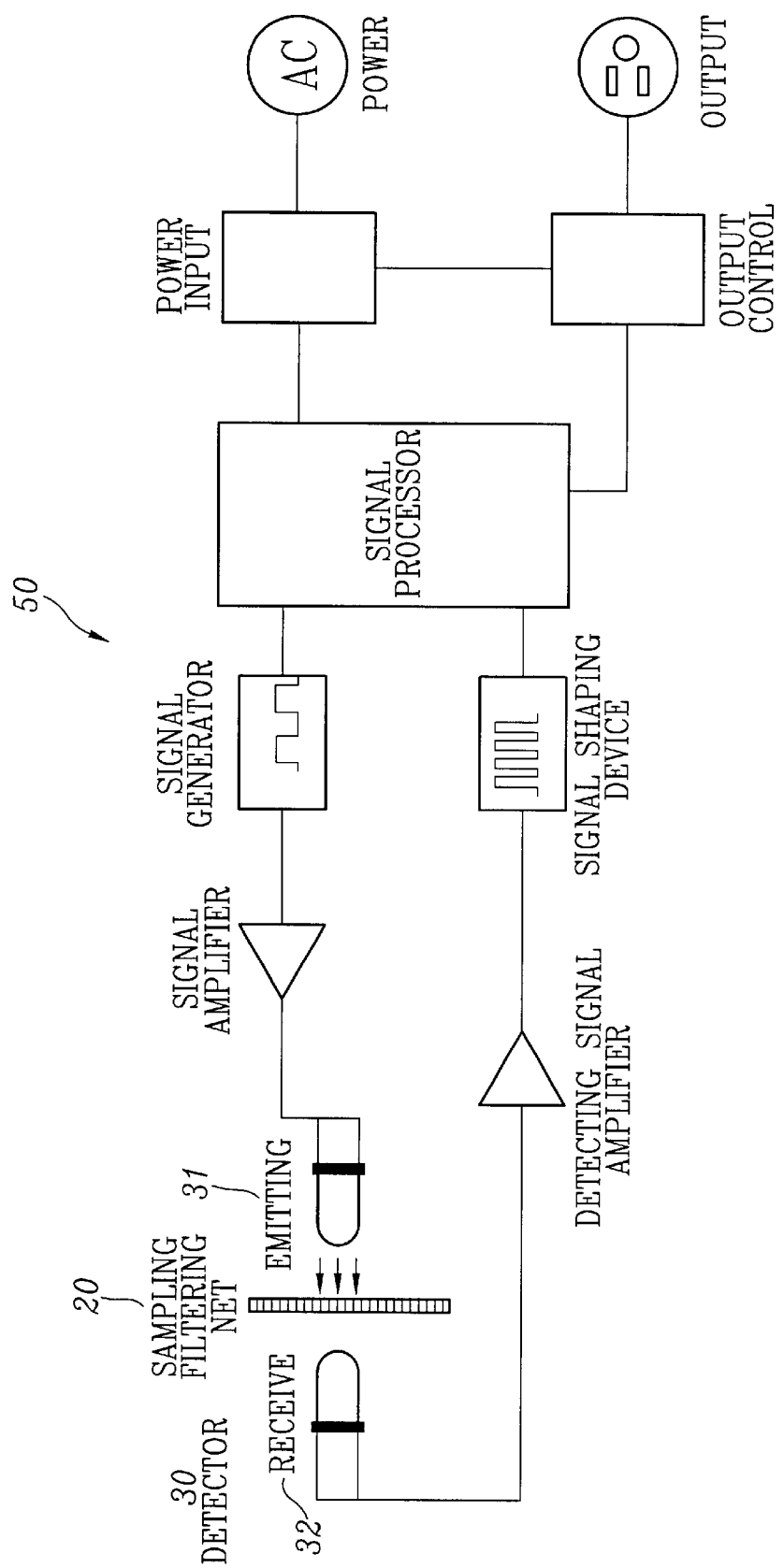
FIG. 5 is a circuit block diagram schematic showing the action of the present invention.
Figure 6:
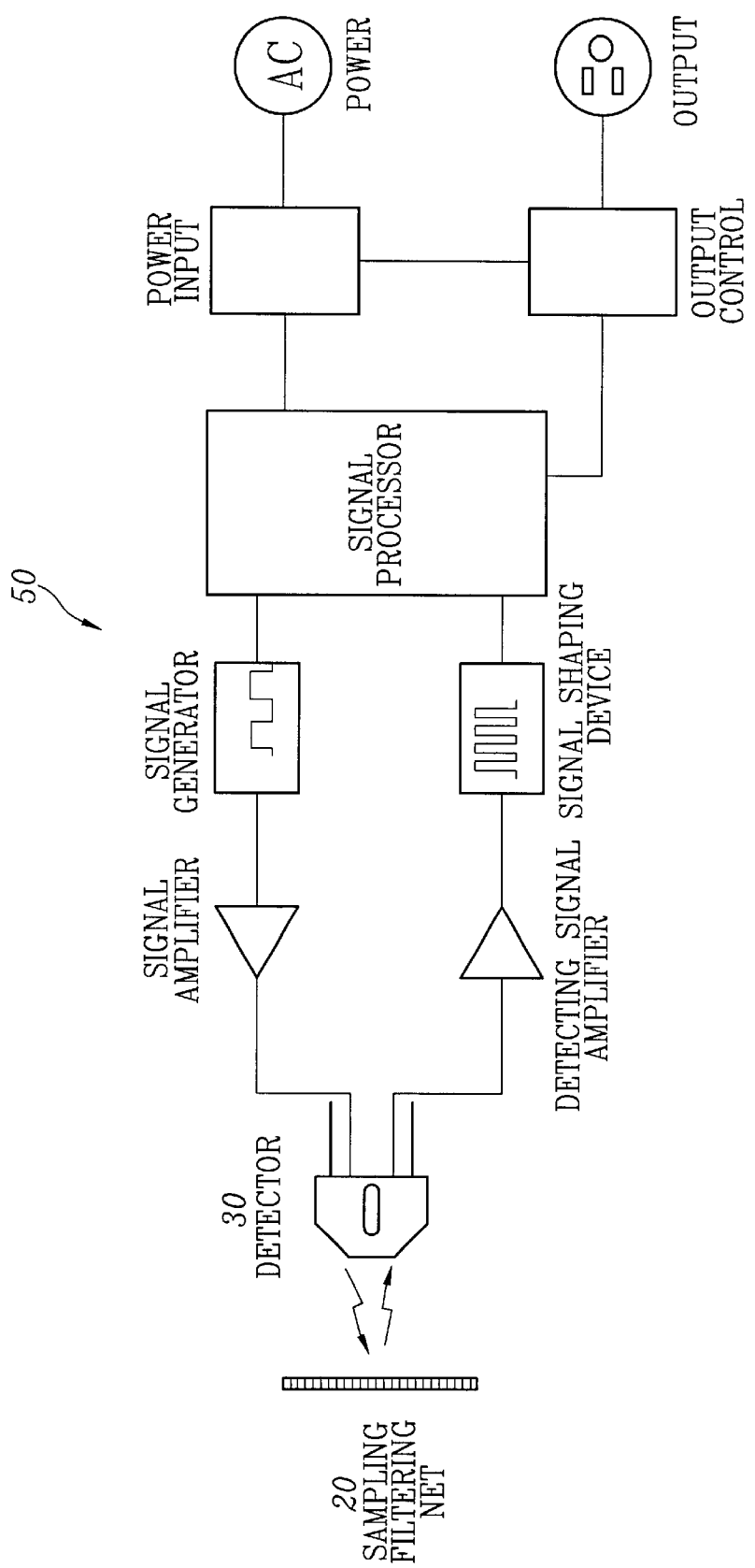
FIG. 6 is a circuit block diagram schematic showing the action in another the present invention of the present invention.

The detecting unit 30 includes a transmitter 31 and a receiver 32, which can be controlled by a circuit unit 50 within the outer frame 10. The transmitter 31 and the receiving 32 are located in front of the sampling filtering net 20 or at the lateral wall of the wind groove 13 with a proper distance to the rear side thereof. Moreover, a best transmitting and the receiving angle is formed. The detecting unit 30 may transmits signals through the transmitting 31, and through the sampling filtering net 20, the receiver 32 will receive the signal. This is a standard mode (as shown in FIGS. 2 and 5). In this mode, the transmitter 31 and the receiver 32 are installed at two sides of the sampling filtering net 20, respectively. By the amount of collecting dusts in the sampling filtering net 20, the receiving signal of the receiver 32 will be interrupted so as to emit an warning to inform the user. Moreover, as shown in FIG. 3, in the detecting unit 30, a standard detecting mode (as shown in FIG. 3 and 6) is set so that the receiver 32 does not receive the transmitting signal from the receiver 32. In this mode, the transmitter 31 and the receiver 32 are located at the same side of the sampling filtering net 20. By the amount of collecting dusts in the sampling filtering net 20, the emitting signal will be reflected by the dusts so as to be received by the receiver. Thus, a conductive state is formed and an equal warning effect is achieved. Moreover, the detecting unit 30 can be further installed with an adjusting button 33 for adjusting the emitting strength of the transmitter. The sensitivities of the transmitter 31 and the receiver 32 of the detecting unit 30 can be adjusted as required for adjusting the amount of collecting dust.

The track groove adjusting unit 40 is installed at another lateral wall of the wind groove 13 of the outer frame 10. The track groove adjusting unit 40 includes an upper and a lower track grooves 41. The two track grooves 41 are installed with a plurality of positioning grooves 42 having the function of positioning and adjusting. The positioning grooves 42 of the upper and the lower track grooves 41 are correspondent with one another. One lateral side of the sampling filtering net 20 can be selectably positioned in the positioning grooves 42 of the two track grooves 41 so that the sampling filtering net 20 can be positioned in different angle for receiving wind.

The circuit unit 50 is installed at the proper position within the outer frame 10 for controlling the operation of the detecting unit 30, and is installed with an informing circuit for generating the voice of warning, light, speech, etc. By aforesaid components, a filtering net detecting and sensing device is formed.

In the present invention, by the function of the automatic detection and warning of the detecting unit 30, when the amount of collecting dusts of the sampling filtering net 20 has been over a standard value. The circuit unit 50 will generate a warning voice, light and speech signals. In the present invention, by a design of the sampling filtering net, the amount of collecting dusts on the sampling filtering net 20 is as a object of sensing. Thus, the amount of collecting dusts on the sampling filtering net 20 can be detected so as to emit an warn to inform the user. Moreover, under the condition of unchanging the conventional filtering net of an air conditioner, the present invention can be added to an air conditioner. While the conventional way of accumulating the using time is improved by the present invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An automatic detection and warning device for a filtering net of an air conditioner comprising:
    an outer frame installed with at least one wind inlet and at least one wind outlet, a wind groove being formed between the wind inlet and the wind outlet;
    a sampling filter net installed in the wind groove of the outer frame;
    a detecting unit comprising a transmitter and a receiver for detecting the amount of collecting dusts on the sampling filter net, the transmitter and receiver each being disposed in spaced manner from the sampling filter net; and
    a circuit unit installed within the outer frame for controlling the operation of the detecting unit.

2. The automatic detection and warning device of the filtering net of an air conditioner as claimed in claim 1, wherein the sampling filtering net is pivotally connected to the wind groove of the sampling filtering net, an adjusting rod is installed at the sampling filtering net, the adjusting rod protrudes out of the outer frame; the sampling filtering net can be driven by the wind groove of the outer frame to be positioned at various orientations for receiving wind; a track groove adjusting unit being installed at the lateral wall of the wind groove of the outer frame; a plurality of positioning grooves having the function of positioning and adjustment being installed in the track groove adjusting unit; one lateral side of the sampling filtering net being positioned in the positioning groove so that the sampling filtering net can be positioned in various orientations for receiving wind.

3. The automatic detection and warning device of the filtering net of an air conditioner as claimed in claim 2, wherein a circular adjusting groove is installed at the outer frame, the adjusting rod penetrates out of the outer frame from the adjusting groove.

4. The automatic detection and warning device of the filtering net of an air conditioner as claimed in claim 2, wherein a pivotal shaft is installed at one side of the sampling filtering net for being pivotally connected to the wind groove of the outer frame.

5. The automatic detection and warning device of the filtering net of an air conditioner as claimed in claim 2, wherein the track groove adjusting unit includes an upper and a lower track grooves, the positioning groove is installed on the two track grooves.

6. The automatic detection and warning device of the filtering net of an air conditioner as claimed in claim 1, wherein the transmitter and the receiver are installed at two sides of the sampling filtering net, by the amount of collecting dusts of the sampling filtering net, the receiving signal of the receiver is interrupted so as to form with a turning off condition and to warning the user.

7. The automatic detection and warning device of the filtering net of an air conditioner as claimed in claim 1, wherein the transmitter and the receiver are installed at the same side of the sampling filtering net, by the signal being interrupted by the amount of collecting dusts on the sampling filtering net, the emitting signal will be reflected, and is received by the receiver at the same side so as to form with a turning on condition in order to inform the user.

8. The automatic detection and warning device of the filtering net of an air conditioner as claimed in claim 1, wherein a transmitter transmitting strength adjusting button is installed at the detecting unit, the adjusting button has the function of automatically adjusting and setting transmitting strength.

9. The automatic detection and warning device of the filtering net of an air conditioner as claimed in claim 1, wherein the circuit unit is installed with circuit with voice, light or speech warning functions.

10. An automatic detection and warning device for a filtering net of an air conditioner comprising:
    an outer frame installed with at least one wind inlet and at least one wind outlet, a wind groove being formed between the wind inlet and the wind outlet;
    a sampling filter net installed in the wind groove of the outer frame;
    a detecting unit comprising a transmitter and a
    a detecting unit comprising a transmitter and a receiver for detecting the amount of collecting dusts on the sampling filter net; and a circuit unit installed within the outer frame for controlling the operation of the detecting unit;

wherein the sampling filtering net is pivotally connected to the wind groove of the sampling filtering net, an adjusting rod is installed at the sampling filtering net, the adjusting rod protrudes out of the outer frame; the sampling filtering net can be driven by the wind groove of the outer frame to be positioned at various orientations for receiving wind; a track groove adjusting unit being installed at the lateral wall of the wind groove of the outer frame; a plurality of positioning grooves having the function of positioning and adjustment being installed in the track groove adjusting unit; one lateral side of the sampling filtering net being positioned in the positioning groove so that the sampling filtering net can be positioned in various orientations for receiving wind.

11. The automatic detection and warning device for a filtering net of an air conditioner as claimed in claim 10, wherein a circular adjusting groove is installed at the outer frame from the adjusting groove.

12. The automatic detection and warning device for a filtering net of an air conditioner as claimed in claim 10, wherein a pivotal shaft is installed at one side of the sampling filtering net for being pivotally connected to the wind groove of the outer frame.

13. The automatic detection and warning device for a filtering net of an air conditioner as claimed in claim 10, wherein the track groove adjusting unit includes an upper and a lower track grooves, the positioning groove being installed on the two track grooves.

14. An automatic detection and warning device for a filtering net of an air conditioner comprising:

an outer frame installed with at least one wind inlet and at least one wind outlet, a wind groove being formed between the wind inlet and the wind outlet;

a sampling filter net installed in the wind groove of the outer frame;

a detecting unit comprising a transmitter and a receiver for detecting the amount of collecting dusts on the sampling filter net; and a circuit unit installed within the outer frame for controlling the operation of the detecting unit;

wherein the transmitter and the receiver are installed at two sides of the sampling filtering net, by the amount of collecting dusts of the sampling filtering net, the receiving signal of the receiver is interrupted so as to form with a turning off condition and to warning the user.

15. An automatic detection and warning device for a filtering net of an air conditioner comprising:

an outer frame installed with at least one wind inlet and at least one wind outlet, a wind groove being formed between the wind inlet and the wind outlet;

a sampling filter net installed in the wind groove of the outer frame;

a detecting unit comprising a transmitter and a receiver for detecting the amount of collecting dusts on the sampling filter net; and a circuit unit installed within the outer frame for controlling the operation of the detecting unit;

wherein the transmitter and the receiver are installed at the same side of the sampling filtering net, by the signal being interrupted by the ampount of collecting dusts on the sampling filtering net, the emitting signal will be reflected, and is received by the receiver at the same side so as to form with a turning on condition in order to inform the user.

16. An automatic detection and warning device for a filtering net of an air conditioner comprising:

an outer frame installed with at least one wind inlet and at least one wind outlet, a wind groove being formed between the wind inlet and the wind outlet;

a sampling filter net installed in the wind groove of the outer frame;

a detecting unit comprising a transmitter and a receiver for detecting the amount of collecting dusts on the sampling filter net; and a circuit unit installed within the outer frame for controlling the operation of the detecting unit;

wherein a transmitter transmitting strength adjusting button is installed at the detecting unit, the adjusting button has the function of automatically adjusting and setting transmitter strength.

* * * * *